M. L. Parry,
Saw Gummer,
N°. 15,082.                                   Patented June 10, 1856.

UNITED STATES PATENT OFFICE.

M. L. PARRY, OF GALVESTON, TEXAS.

METHOD OF REPAIRING CIRCULAR-SAW TEETH.

Specification of Letters Patent No. 15,082, dated June 10, 1856.

*To all whom it may concern:*

Be it known that I, M. L. PARRY, of Galveston, in the county of Galveston and State of Texas, have invented a new and Improved Device to be Adapted to Circular Saws for the Purpose of Enabling the Teeth to be Hammered and Drawn Out with Facility; and I do hereby declare that the following is a full, clear, and exact description of the same, reference being had to the annexed drawings, making a part of this specification, in which—

Figure 1:
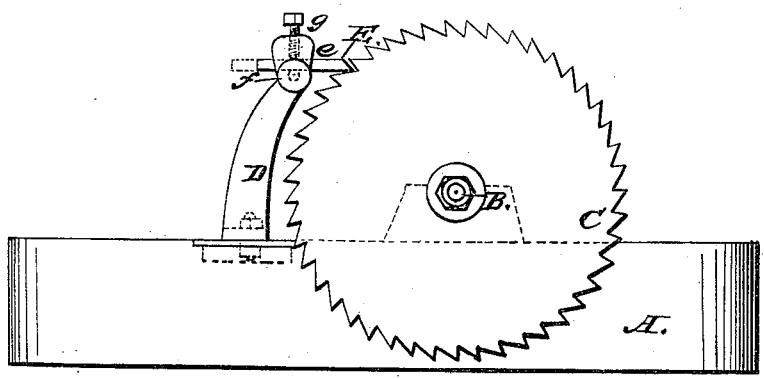
Figure 2:
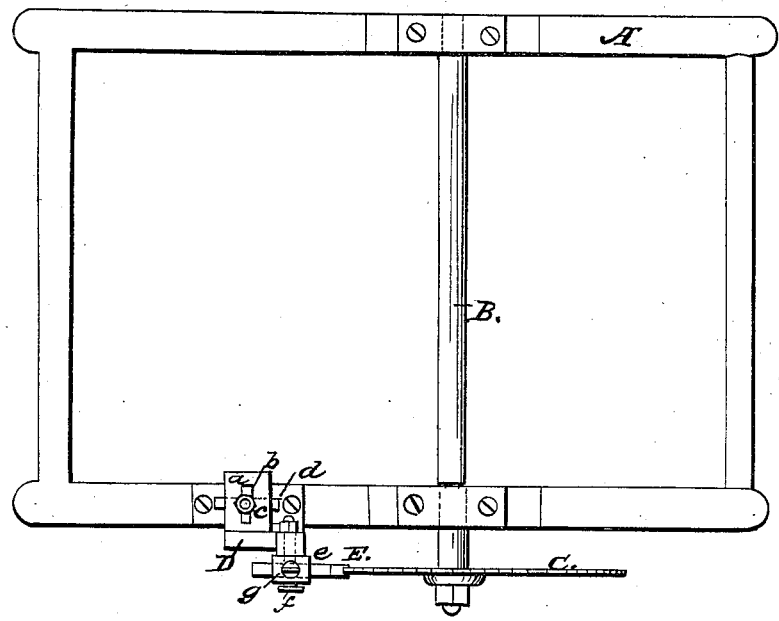

Figure 1, is a side view of my improvement. Fig. 2, is a plan or top view of the same.

Similar letters of reference indicate corresponding parts in the two figures.

My invention consists in having a sliding or adjustable stop or mandrel fitted in the upper part of an adjustable arm, said arm being attached to the frame in which the saw arbor is fitted and so arranged that the stop or mandrel may be fitted between the teeth of the saw as will be presently shown and described.

To enable those skilled in the art to fully understand and construct my invention, I will proceed to describe it.

A, represents a square or rectangular frame, in which a saw arbor B, is fitted.

C, represents the circular saw attached to the end of the arbor B.

D, represents an arm the lower end of which has a plate (*a*), attached to it. The plate (*a*), has a slot (*b*), made in it and a set screw (*c*), passes through said slot and through a slot (*d*), made through one of the side pieces of the frame A. The slot (*d*), in the side piece of the frame A, and the slot (*b*), in the plate (*a*), cross each other at right angles as plainly shown in Fig. 2. To the upper part of the arm D, there is attached a socket (*e*), in which a stop or mandrel E, is fitted. This stop or mandrel is formed of a square bar of metal having its outer end beveled or cut obliquely to correspond in form to the spaces between the teeth of the saw as shown clearly in Fig. 1. The socket (*e*), is not permanently attached to the arm, but is connected to it by a screw bolt (*f*), so that the stop or mandrel may be inclined as desired to suit the rake or "pitch" of the teeth. The arm D, may also be adjusted by means of the set screw (*c*), so as to suit different sized saws.

The stop or mandrel may be adjusted in or out from the saw teeth by turning a set screw (*g*), which passes vertically into the top of the socket (*e*). The teeth where necessary may be hammered out upon the end of the stop or mandrel, and in filing the strop or mandrel keeps the saw steady and prevents it from turning.

The device is simple, economically applied and will be of great assistance to sawyers as they may keep their saws in perfect order with the greatest facility.

What I claim as new and desire to secure by Letters Patent is—

The stop or mandrel F, fitted within an adjustable socket (*e*), which is attached to an arm D, the arm being secured to the frame A, the above parts being arranged as shown for the purpose specified.

M. L. PARRY.

Witnesses:
M. M. POTTER,
R. H. HOWARD.